(12) United States Patent
Michalski (10) Patent No.: US 11,324,352 B2
(45) Date of Patent: May 10, 2022

(54) POLYGONAL, INTERLOCKING PANEL TREE AND DISPLAY STAND

(71) Applicant: Joel Thomas Michalski, Long Beach, CA (US)

(72) Inventor: Joel Thomas Michalski, Long Beach, CA (US)

( * ) Notice: Subject to any disclaimer, the term of this patent is extended or adjusted under 35 U.S.C. 154(b) by 0 days.

(21) Appl. No.: 17/114,162

(22) Filed: Dec. 7, 2020

(65) Prior Publication Data

US 2021/0169259 A1   Jun. 10, 2021

Related U.S. Application Data

(60) Provisional application No. 62/944,640, filed on Dec. 6, 2019.

(51) Int. Cl.
*A47G 33/06* (2006.01)
*F16B 5/00* (2006.01)
*G09F 1/08* (2006.01)

(52) U.S. Cl.
CPC .............. *A47G 33/06* (2013.01); *F16B 5/002* (2013.01); *G09F 1/08* (2013.01)

(58) Field of Classification Search
CPC ............ A47G 33/06; F16B 5/002; G09F 1/08
See application file for complete search history.

(56) References Cited

U.S. PATENT DOCUMENTS

| | | | | |
|---|---|---|---|---|
| 1,052,187 A * | 2/1913 | Stranders | ................... | G09F 1/06 40/539 |
| 1,194,678 A * | 8/1916 | Stranders | ................... | G09F 1/06 40/539 |
| 1,881,424 A * | 10/1932 | Favreau | ................... | A47G 33/06 362/123 |
| 1,958,569 A * | 5/1934 | Einson | ................... | A47F 5/112 40/539 |
| 2,103,748 A * | 12/1937 | Horr | ................... | G09F 1/06 40/539 |
| 4,315,376 A * | 2/1982 | Eichenauer | ................ | G09F 1/14 40/124.4 |
| 4,372,086 A * | 2/1983 | Hanlon | ................... | A47F 5/112 160/135 |
| 4,550,839 A * | 11/1985 | Good | ..................... | A47G 33/06 211/189 |
| 6,199,308 B1 * | 3/2001 | Westendorp | ......... | B42D 15/008 40/124.08 |
| 6,936,314 B1 * | 8/2005 | Schultz | ................... | A41G 1/007 428/18 |
| 9,488,320 B1 * | 11/2016 | Palfreyman | ........... | F21V 17/007 |
| D778,202 S * | 2/2017 | Aikin | ........................ | D11/118 |
| 2008/0271483 A1 * | 11/2008 | Horkey | ..................... | A47F 5/04 63/23 |
| 2009/0211124 A1 * | 8/2009 | Horkey | ................... | G06Q 99/00 40/1 |
| 2012/0027963 A1 * | 2/2012 | Dube | ..................... | A47G 33/06 428/20 |
| 2020/0168127 A1 * | 5/2020 | Santoro | ..................... | G09F 1/08 |

\* cited by examiner

*Primary Examiner* — Gary C Hoge
(74) *Attorney, Agent, or Firm* — Umberg Zipser LLP (57) ABSTRACT

The present invention comprises a set of interlocking panels arranged in stacked polygons to create a scalable, re-useable and flat-packable Christmas tree or display stand that substitutes for traditional Christmas trees in that it allows for use of standard string lights, garland, traditional hanging ornaments or also as a standalone stylized Christmas tree or display stand. In some embodiments, the panels could also be combined to form other objects.

14 Claims, 8 Drawing Sheets

POLYGONAL, INTERLOCKING PANEL TREE AND DISPLAY STAND

This application claims priority to U.S. provisional patent application having Ser. No. 62/944,640 filed on Dec. 6, 2019. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is decorative trees and other objects.

BACKGROUND

The following description includes information that may be useful in understanding the present invention. It is not an admission that any of the information provided herein is prior art or relevant to the presently claimed invention, or that any publication specifically or implicitly referenced is prior art.

Artificial Christmas trees are widely available and typically made from plastic, silks, aluminum or other synthetic materials to create a literal representation of an evergreen tree. Most abstract artificial trees are made from two-dimensional cutouts from panel material such as cardboard, fiberboard or plywood. These two-dimensional cutout trees are often connected at the central vertical axis to give a vague appearance of three-dimensional fullness. Such artificial trees are limited to seasonal use and require large boxes or containers for storage when not in use.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for artificial trees that have a three-dimensional fullness while allowing for storage as a flatpack.

SUMMARY OF THE INVENTION

The inventive subject matter provides apparatus, systems and methods for a geometric arrangement of interlocking panels that in some embodiments can be configured to appear as a three-dimensional, fully-formed tree and/or display stand.

The present invention uses detachable, interlocking panels arranged in stacked polygons to create a scalable, re-useable and flat-packable object such as a Christmas tree or display stand that substitutes for a traditional Christmas tree in that it allows for use of standard string lights, garland, traditional hanging ornaments or also as a standalone stylized Christmas tree or display stand.

Preferably, the interlocking panels of the object can be disassembled and flat packed for efficient storage.

It is contemplated that the concept can be scalable, such that the object could have a mailable card size to a multi-storied object for a commercial installation.

Figure 1:
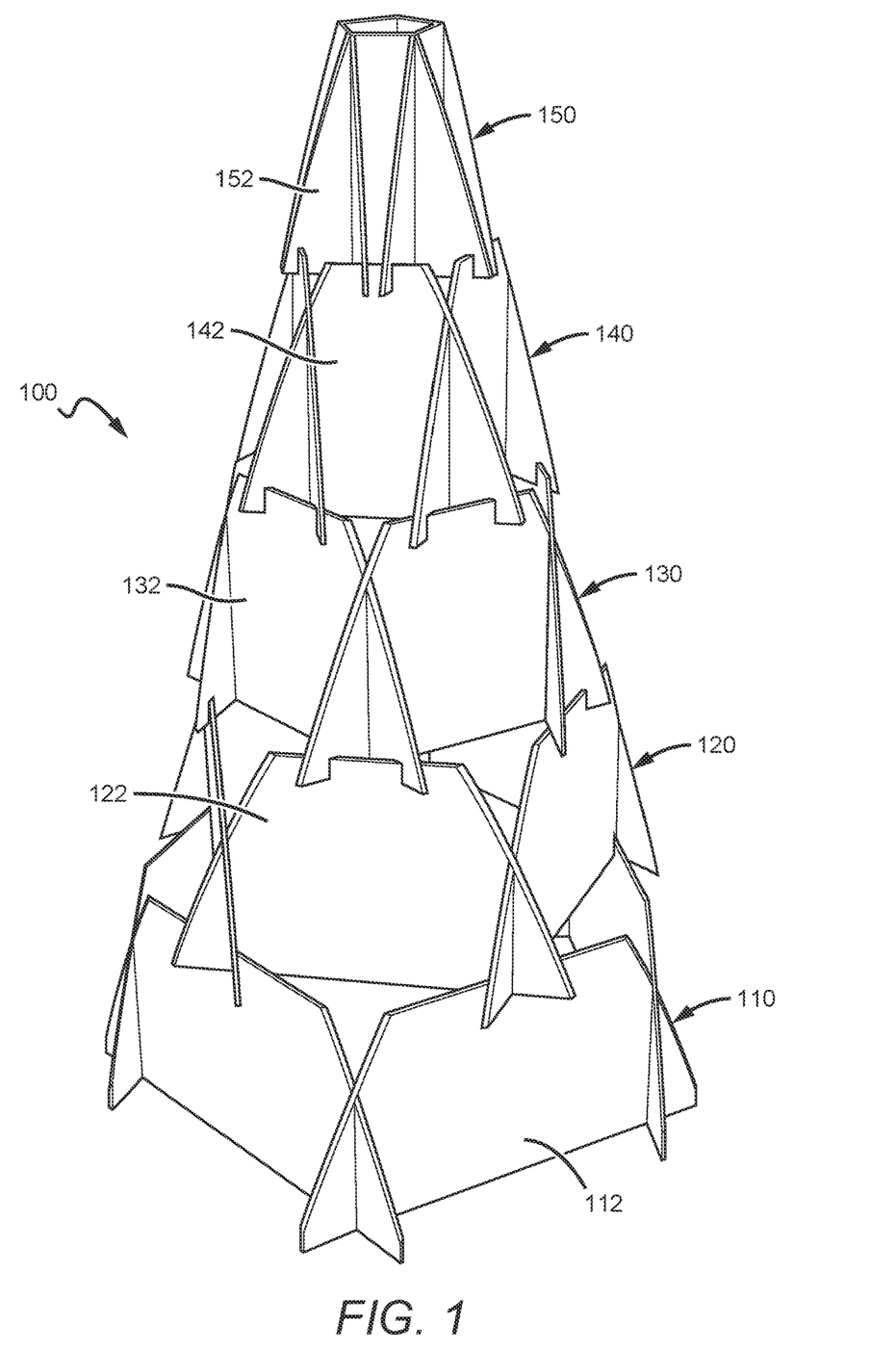
FIG. 1 illustrates a perspective view of one embodiment of an object comprised of five layers of interlocking panels each having a trapezoid shape.

The connection points of the interlocking panels are based on flat panels arranged vertically with layers below supporting layers above. Starting at a base layer (bottom layer), the next layer is rotated such that five sides extend over the mid-section of sides of the pentagon layer below. The first embodiment shown in the FIG. 1 shows the use of stacked pentagons but could be arranged with any stacked polygons (e.g. triangles, squares, pentagons, hexagons, heptagons, octagons, etc.), stacked one on top the other in multiple layers of diminishing size to give the appearance of a conical shaped tree—wide at the bottom and narrow at the top.

Panels on the same layer preferably share sliding slot connection points. Layers below support layers above at similarly slotted connection points. Within the constraint of the panel connecting points 3, any decorative styling of the panels can be applied. The decorative styling of the panels is unlimited. The decorative elements can take on the appearance of a holiday tree, a commercial branded tree, a unique holding rack for product display, an artistic sculpture, etc.

A fully formed tree can be composed of the interlocking panels. Any style tree can be designed as long as the generalized panel geometry and connecting points are maintained within the style elements of the design.

Utilizing the same geometric arrangement of the panels, a base and topper can be added to fully decorate the final tree form. Any style topper or base can be utilized within the constraints of the panel connection points.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1-4 illustrates one embodiment of a three-dimensional object 100 formed of interlocking panels to form a tree shape. Preferably, each row or layer of the object 100 comprises a set of panels that interconnect to form the row or layer of the object 100.

For example, the bottom row or layer 110 comprises a set of panels 112 that interconnect to form the bottom row or layer 110 of the object 100. A second row or layer 120 comprises a set of panels 122 that interconnect to form the bottom row or layer 120. At least some of the set of panels 122 are also configured to interlock with at least some of the set of panels 112 of the bottom row or layer 110. A third row or layer 130 comprises a set of panels 132 that interconnect to form the bottom row or layer 130. At least some of the set of panels 132 are also configured to interlock with at least some of the set of panels 122 of the second row or layer 120.

A fourth row or layer 140 comprises a set of panels 142 that interconnect to form the bottom row or layer 140. At least some of the set of panels 142 are also configured to interlock with at least some of the set of panels 132 of the third row or layer 130. A fifth row or layer 150 comprises a set of panels 152 that interconnect to form the bottom row or layer 150. At least some of the set of panels 152 are also configured to interlock with at least some of the set of panels 142 of the third row or layer 140.

In preferred embodiments, the geometric arrangement of the fully assembled, interlocking panels create the object 100 that appears as a three-dimensional fully formed tree and/or display stand.

Although five layers or rows are shown in the object of FIG. 1, it is contemplated that fewer or greater number of layers or rows could be used depending of the specific size and dimensions of the panels and the overall size and dimension of the assembled object. FIG. 1 represents one possible arrangement of stacked polygons.

Figure 4:
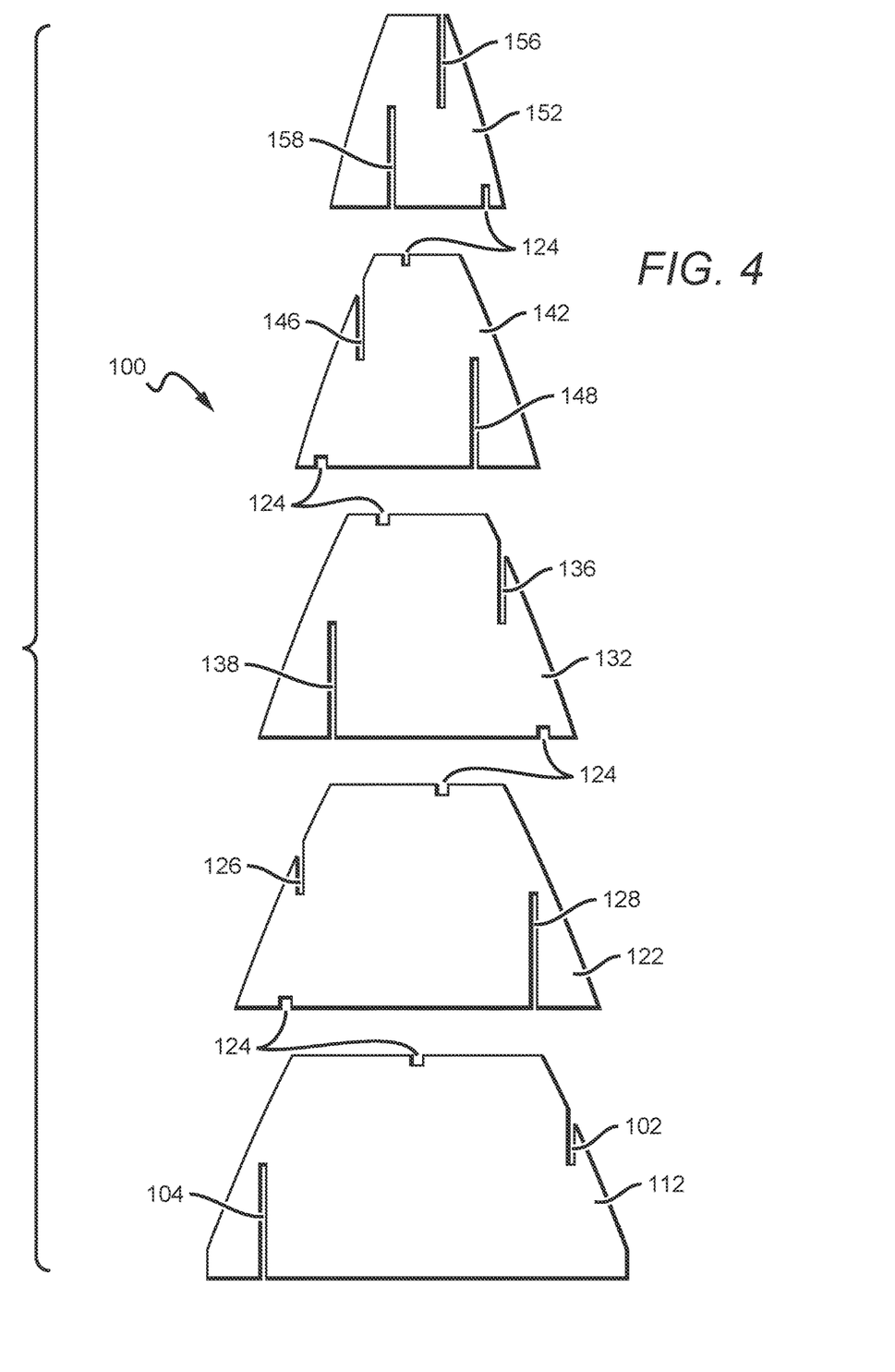
FIG. 4 illustrates front views of five individual panels that when connected form a portion of the object of FIG. 1.

As shown in FIG. 4, each of the panels 112, 122, 132, 142, and 152 comprises a generally trapezoidal shape. Preferably, each of the panels comprises an upper notch and a lower notch, where the upper and lower notches are disposed on opposing vertical and horizontal sides of the panel.

Thus, for example, panel 112 comprises an upper notch 102 on an upward-facing surface and a lower notch 104 on a downward facing surface, where the upper notch 102 is disposed on a right side of the panel 112 and the lower notch 104 is disposed on a left side of the panel 112, as defined by a center line that bisects the panel vertically. Of course, the left and right sides could be swapped by simply rotating panel 112. Panel 112 also preferably comprises at least one other notch 124 on the upper surface, which is where one or more of panels 122 may rest when the object is assembled. Thus, notches 102 and 104 show the slots where panels of the same row or layer overlap and connect and notch 124 shows where panels from the layer below support the panel layer above.

Panel 122 comprises an upper notch 126 on an upward-facing surface and a lower notch 128 on a downward facing surface, where the upper notch 126 is disposed on a left side of the panel 122 and the lower notch 128 is disposed on a right side of the panel 122, as defined by a center line that bisects the panel vertically. Of course, the left and right sides could be swapped by simply rotating panel 122. Panel 122 also preferably comprises at least one other notch 124, and here one notch 124 on the upper surface and one notch 124 of the lower surface.

Panel 132 comprises an upper notch 136 on an upward-facing surface and a lower notch 138 on a downward facing surface, where the upper notch 136 is disposed on a right side of the panel 132 and the lower notch 138 is disposed on a left side of the panel 132, as defined by a center line that bisects the panel vertically. Of course, the left and right sides could be swapped by simply rotating panel 132. Panel 132 also preferably comprises at least one other notch 124, and here one notch 124 on the upper surface and one notch 124 of the lower surface.

Panel 142 comprises an upper notch 146 on an upward-facing surface and a lower notch 148 on a downward facing surface, where the upper notch 146 is disposed on a left side of the panel 142 and the lower notch 148 is disposed on a right side of the panel 142, as defined by a center line that bisects the panel vertically. Of course, the left and right sides could be swapped by simply rotating panel 142. Panel 142 also preferably comprises at least one other notch 124, and here one notch 124 on the upper surface and one notch 124 of the lower surface.

Panel 152 comprises an upper notch 156 on an upward-facing surface and a lower notch 158 on a downward facing surface, where the upper notch 156 is disposed on a right side of the panel 152 and the lower notch 158 is disposed on a left side of the panel 152, as defined by a center line that bisects the panel vertically. Of course, the left and right sides could be swapped by simply rotating panel 152. Panel 152 also preferably comprises at least one other notch 124, and here one notch 124 on the lower surface.

The notches 124 of each of the panels can be the same length and width, or the lengths and widths could vary depending among the panels of different rows or layers.

Figure 2:
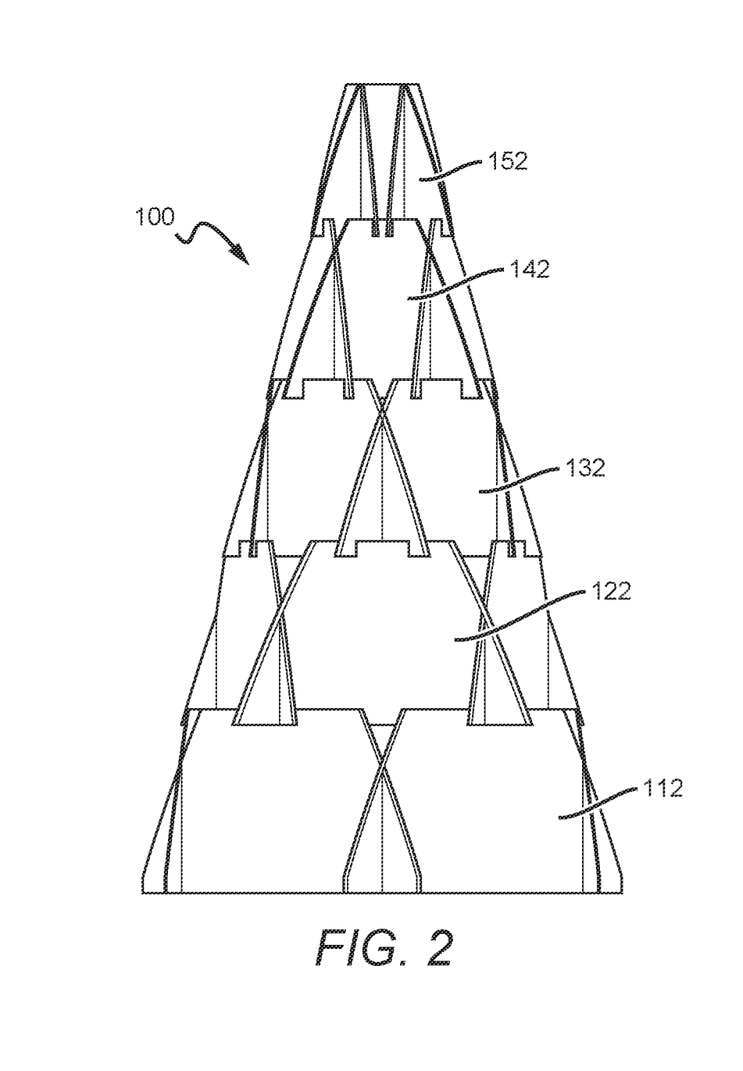
FIG. 2 illustrates a front view of the object of FIG. 1.
Figure 3:
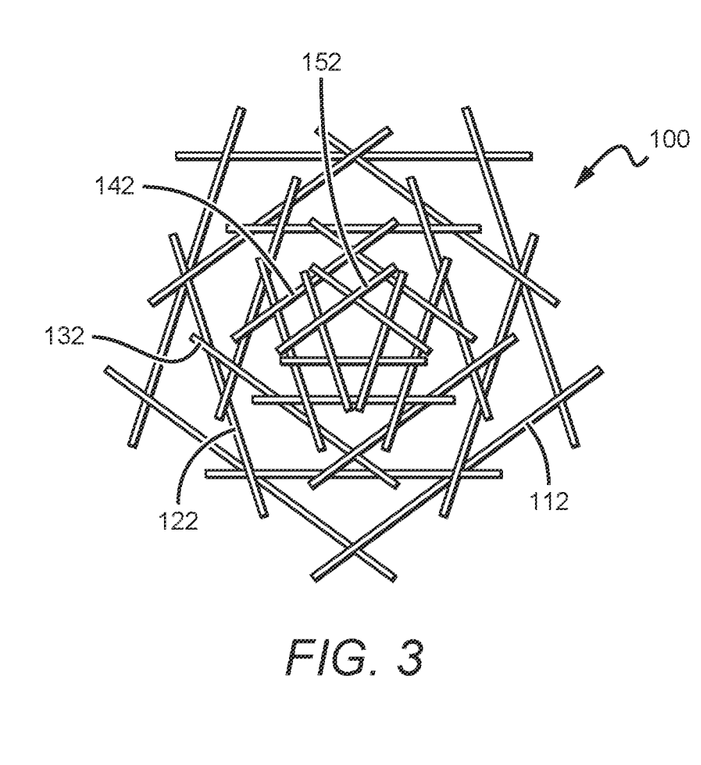
FIG. 3 illustrates a top view of the object of FIG. 1.

As shown in FIGS. 1-3, the panels of each row preferably overlaps with the panels of the lower row such that the panels of the upper row extend beyond (jut out) the panels of the lower row.

Figure 5:
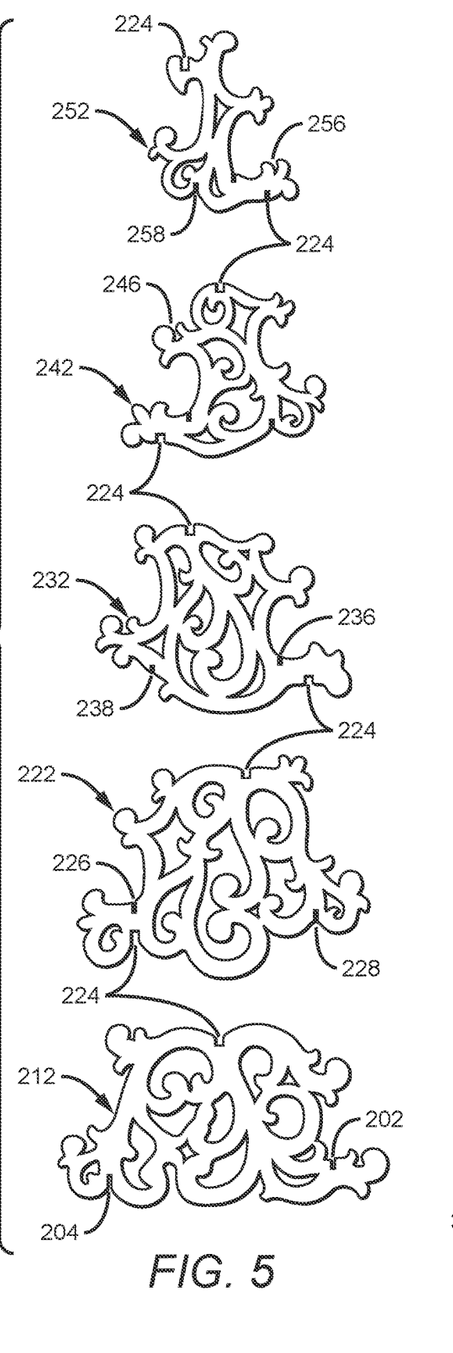
FIG. 5 illustrates another embodiment of panels having a different geometric shape for the panels of FIG. 4.

FIG. 5 illustrates another embodiment of panels 212, 222, 232, 242, 252 having a different size and dimension that can be interconnected to form an object such as a tree. As shown in the figure, each of the panels 212, 222, 232, 242, 252 comprise a geometric shape with a plurality of apertures. In some embodiments, each of the apertures may be closed. The specific shape of the panels can be varied so long as the connecting slot geometry (notches) is maintained as in the generalized panel geometry shown in FIG. 4.

Preferably, each of the panels 212, 222, 232, 242, 252 comprises an upper notch and a lower notch, where the upper and lower notches are disposed on opposing vertical and horizontal sides of the panel.

Thus, for example, panel 212 comprises an upper notch 202 on an upward-facing surface and a lower notch 204 on a downward facing surface, where the upper notch 202 is disposed on a right side of the panel 212 and the lower notch 204 is disposed on a left side of the panel 212, as defined by a center line that bisects the panel vertically. Of course, the left and right sides could be swapped by simply rotating panel 212. Panel 212 also preferably comprises at least one other notch 224 on the upper surface, which is where one or more of panels 222 may rest when the object is assembled. Thus, notches 202 and 204 show the slots where panels of the same row or layer overlap and connect and notch 224 shows where panels from the layer below support the panel layer above.

Panel 222 comprises an upper notch 226 on an upward-facing surface and a lower notch 228 on a downward facing surface, where the upper notch 226 is disposed on a left side of the panel 222 and the lower notch 228 is disposed on a right side of the panel 222, as defined by a center line that bisects the panel vertically. Of course, the left and right sides could be swapped by simply rotating panel 222. Panel 222 also preferably comprises at least one other notch 224, and here one notch 224 on the upper surface and one notch 224 of the lower surface.

Panel 232 comprises an upper notch 236 on an upward-facing surface and a lower notch 238 on a downward facing surface, where the upper notch 236 is disposed on a right side of the panel 232 and the lower notch 238 is disposed on a left side of the panel 232, as defined by a center line that bisects the panel vertically. Of course, the left and right sides could be swapped by simply rotating panel 232. Panel 232 also preferably comprises at least one other notch 224, and here one notch 224 on the upper surface and one notch 224 of the lower surface.

Panel 242 comprises an upper notch 246 on an upward-facing surface and a lower notch 248 on a downward facing surface, where the upper notch 246 is disposed on a left side of the panel 242 and the lower notch 248 is disposed on a right side of the panel 242, as defined by a center line that bisects the panel vertically. Of course, the left and right sides could be swapped by simply rotating panel 242. Panel 242 also preferably comprises at least one other notch 224, and here one notch 224 on the upper surface and one notch 224 of the lower surface.

Panel 252 comprises an upper notch 256 on an upward-facing surface and a lower notch 258 on a downward facing surface, where the upper notch 256 is disposed on a right side of the panel 252 and the lower notch 258 is disposed on a left side of the panel 252, as defined by a center line that bisects the panel vertically. Of course, the left and right sides could be swapped by simply rotating panel 252. Panel 252 also preferably comprises at least one other notch 224, and here one notch 224 on the lower surface.

The notches 224 of each of the panels can be the same length and width, or the lengths and widths could vary depending among the panels of different rows or layers.

Figure 7:
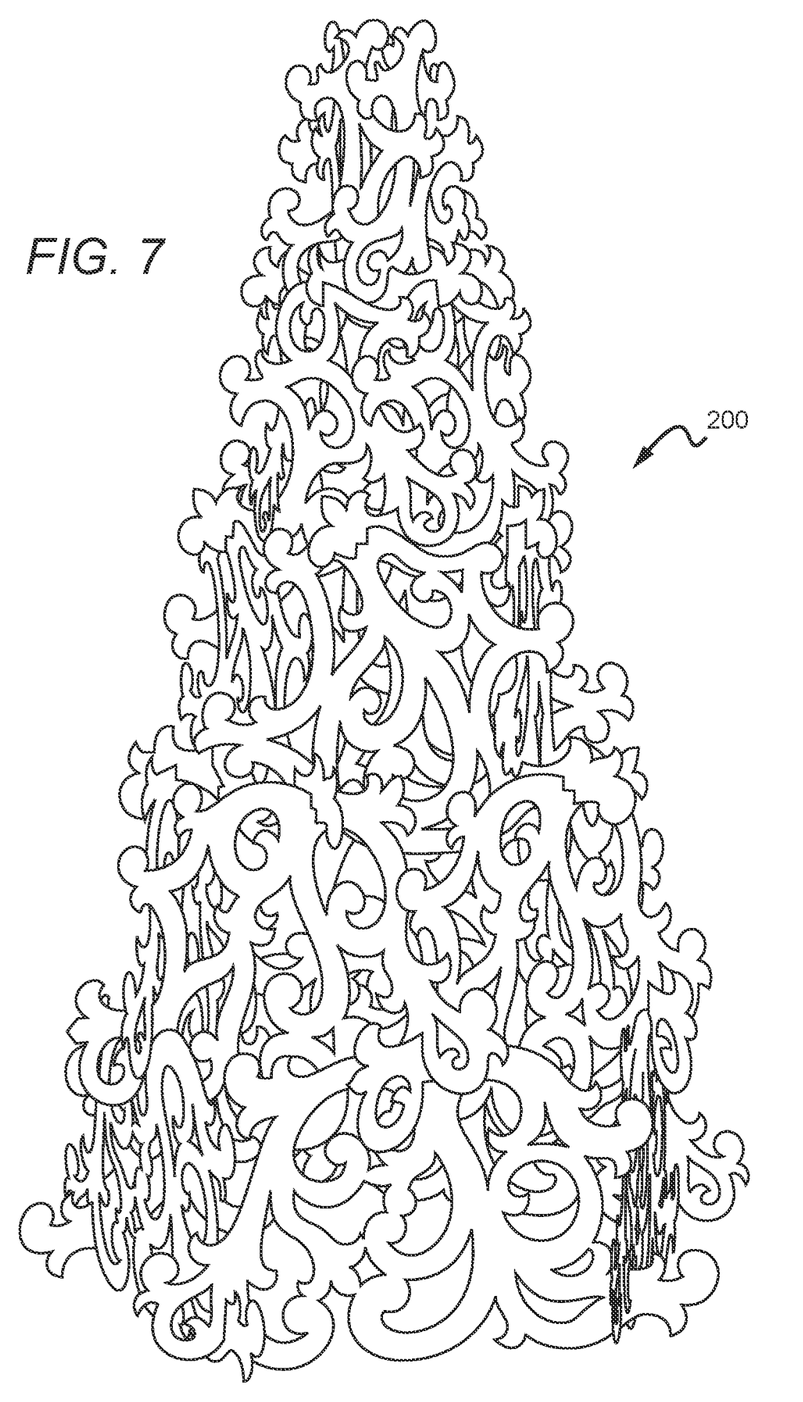
FIG. 7 illustrates a fully assembled object comprising the panels shown in FIG. 5.

As shown in FIG. 7, the panels of each row preferably overlaps with the panels of the lower row such that the panels of the upper row extend beyond (jut out) the panels of the lower row.

FIG. 7 illustrates one embodiment of a three-dimensional object 200 formed of interlocking panels to form a tree shape. Preferably, each row or layer of the object 200 comprises a set of panels such in FIG. 5 that interconnect to form the row or layer of the object 200.

Figure 6:
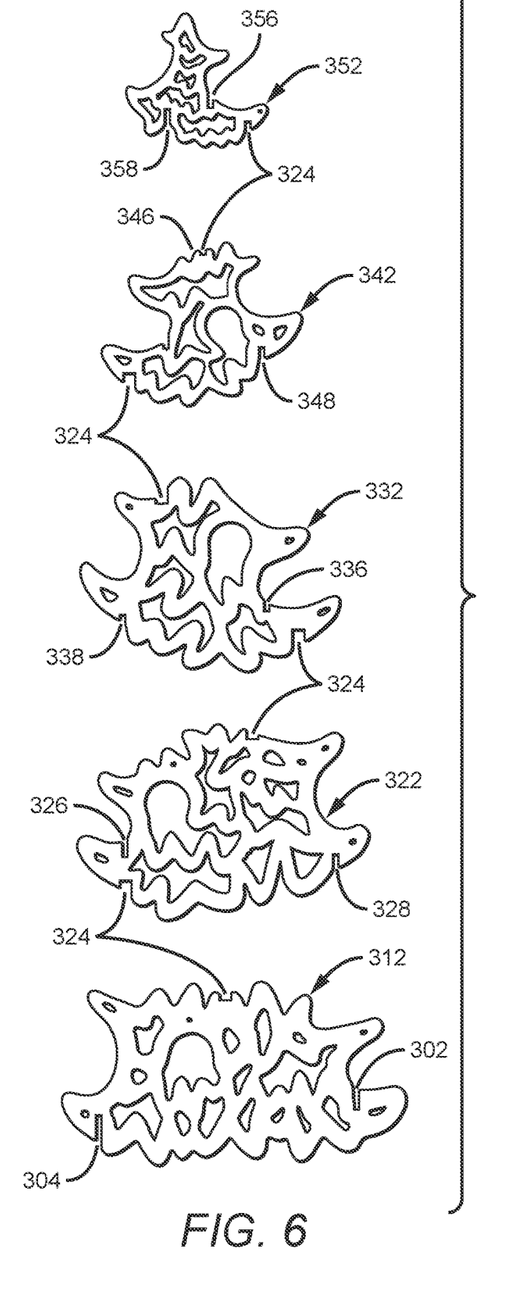
FIG. 6 illustrates another embodiment of panels having a different geometric shape for the panels of FIG. 4.

FIG. 6 illustrates another embodiment of panels 312, 322, 332, 342, 352 having a different size and dimension that can be interconnected to form an object such as a tree. As shown in the figure, each of the panels 312, 322, 332, 342, 352 comprise a geometric shape with a plurality of apertures. In some embodiments, each of the apertures may be closed. The specific shape of the panels can be varied so long as the connecting slot geometry (notches) is maintained as in the generalized panel geometry shown in FIG. 4.

Preferably, each of the panels 312, 322, 332, 342, 352 comprises an upper notch and a lower notch, where the upper and lower notches are disposed on opposing vertical and horizontal sides of the panel.

Thus, for example, panel 312 comprises an upper notch 302 on an upward-facing surface and a lower notch 304 on a downward facing surface, where the upper notch 302 is disposed on a right side of the panel 312 and the lower notch 304 is disposed on a left side of the panel 312, as defined by a center line that bisects the panel vertically. Of course, the left and right sides could be swapped by simply rotating panel 312. Panel 312 also preferably comprises at least one other notch 324 on the upper surface, which is where one or more of panels 322 may rest when the object is assembled. Thus, notches 302 and 304 show the slots where panels of the same row or layer overlap and connect and notch 324 shows where panels from the layer below support the panel layer above.

Panel 322 comprises an upper notch 326 on an upward-facing surface and a lower notch 328 on a downward facing surface, where the upper notch 326 is disposed on a left side of the panel 322 and the lower notch 328 is disposed on a right side of the panel 322, as defined by a center line that bisects the panel vertically. Of course, the left and right sides could be swapped by simply rotating panel 322. Panel 322 also preferably comprises at least one other notch 324, and here one notch 324 on the upper surface and one notch 324 of the lower surface.

Panel 332 comprises an upper notch 336 on an upward-facing surface and a lower notch 338 on a downward facing surface, where the upper notch 336 is disposed on a right side of the panel 332 and the lower notch 338 is disposed on a left side of the panel 332, as defined by a center line that bisects the panel vertically. Of course, the left and right sides could be swapped by simply rotating panel 332. Panel 332 also preferably comprises at least one other notch 324, and here one notch 324 on the upper surface and one notch 324 of the lower surface.

Panel 342 comprises an upper notch 346 on an upward-facing surface and a lower notch 348 on a downward facing surface, where the upper notch 346 is disposed on a left side of the panel 342 and the lower notch 348 is disposed on a right side of the panel 342, as defined by a center line that bisects the panel vertically. Of course, the left and right sides could be swapped by simply rotating panel 342. Panel 342 also preferably comprises at least one other notch 324, and here one notch 324 on the upper surface and one notch 324 of the lower surface.

Panel 352 comprises an upper notch 356 on an upward-facing surface and a lower notch 358 on a downward facing surface, where the upper notch 356 is disposed on a right side of the panel 352 and the lower notch 358 is disposed on a left side of the panel 352, as defined by a center line that bisects the panel vertically. Of course, the left and right sides could be swapped by simply rotating panel 352. Panel 352 also preferably comprises at least one other notch 324, and here one notch 324 on the lower surface.

The notches 324 of each of the panels can be the same length and width, or the lengths and widths could vary depending among the panels of different rows or layers.

Figure 8:
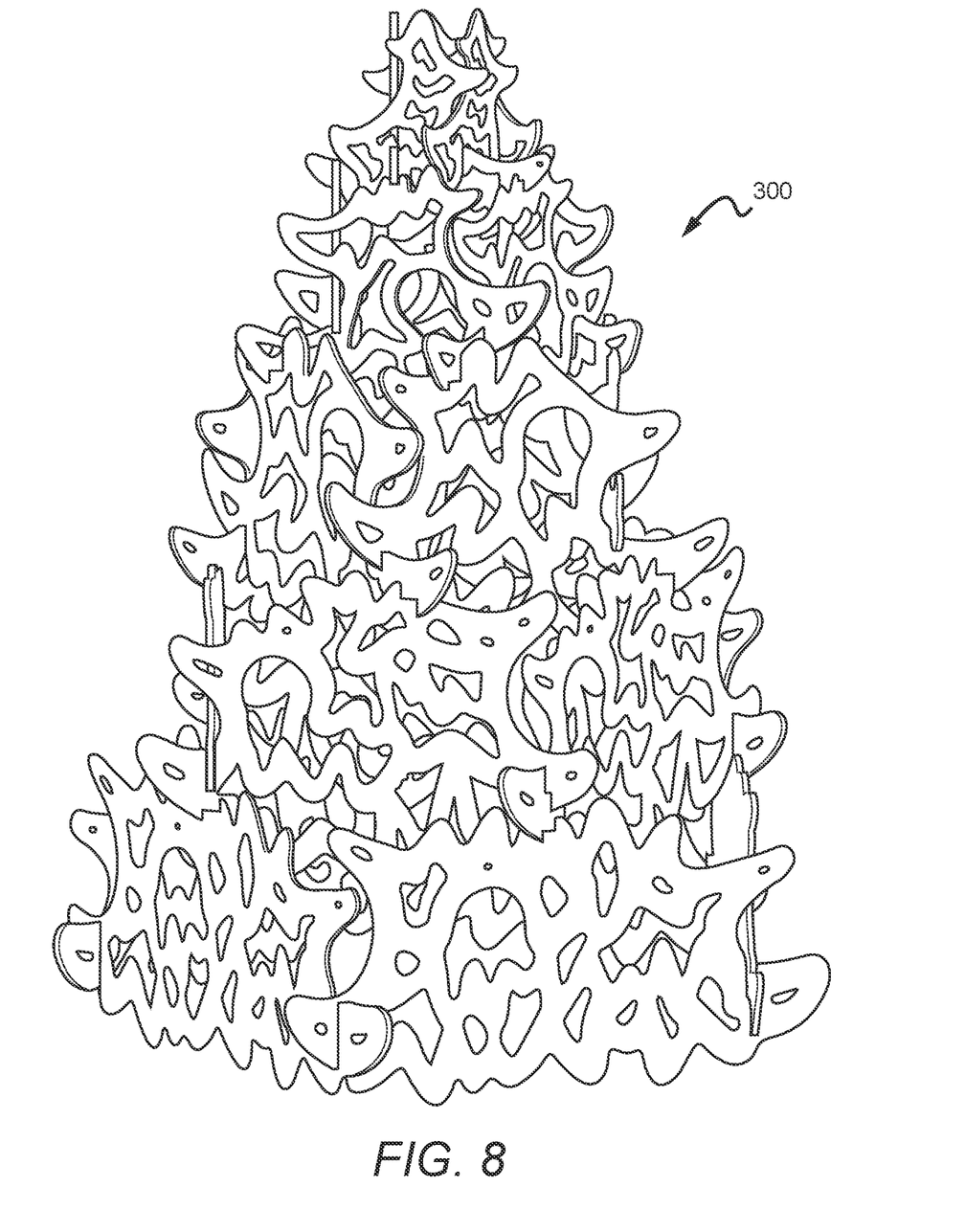
FIG. 8 illustrates a fully assembled object comprising the panels shown in FIG. 6.

As shown in FIG. 8, the panels of each row preferably overlaps with the panels of the lower row such that the panels of the upper row extend beyond (jut out) the panels of the lower row.

FIG. 8 illustrates one embodiment of a three-dimensional object 300 formed of interlocking panels to form a tree shape. Preferably, each row or layer of the object 300 comprises a set of panels such in FIG. 6 that interconnect to form the row or layer of the object 200.

Figure 9:
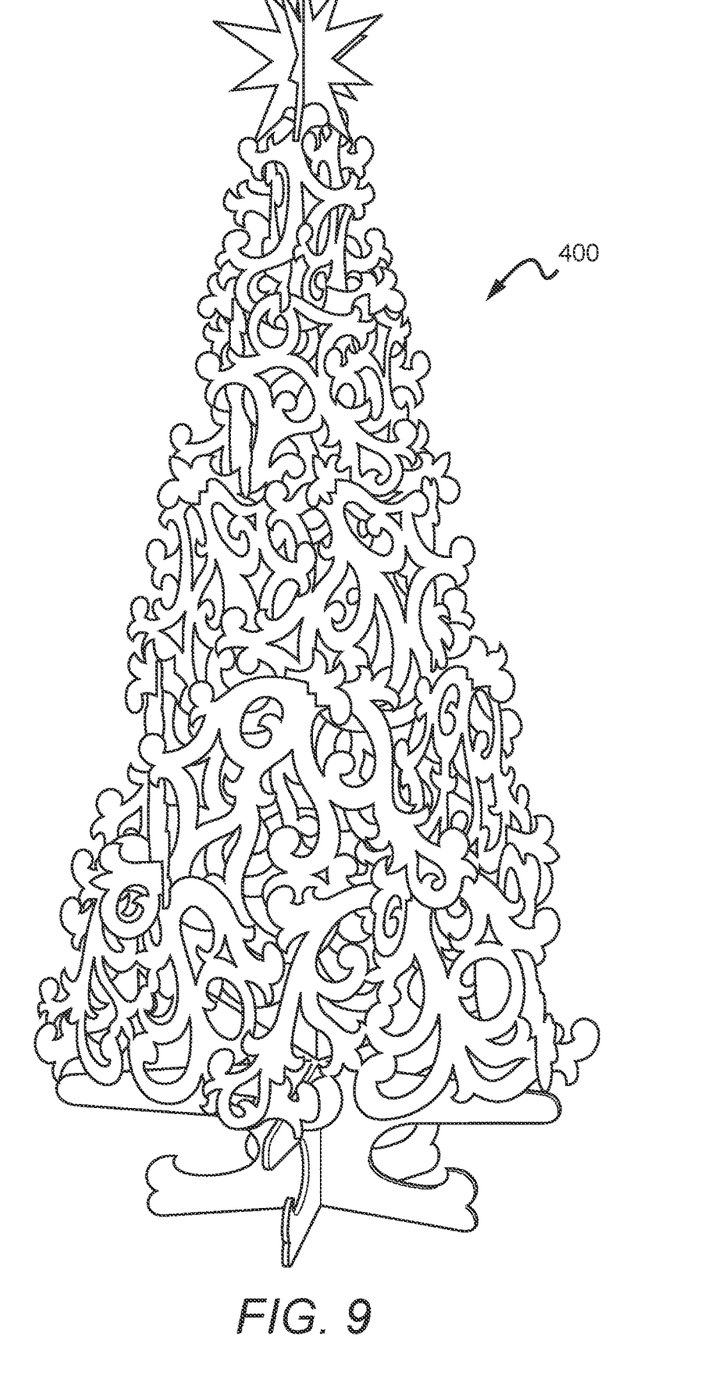
FIG. 9 illustrates a fully assembled object comprising the panels shown in FIG. 5 having a topper and base.

FIG. 9 illustrates the three-dimensional object 200 formed of interlocking panels to form a tree shape having a star and a base (in this case meant to look like a tree trunk with stylized roots). Preferably, the topper and base share the same connecting slot geometry as the other layers. The topper and base can be any style.

Figures 10A, 10B:
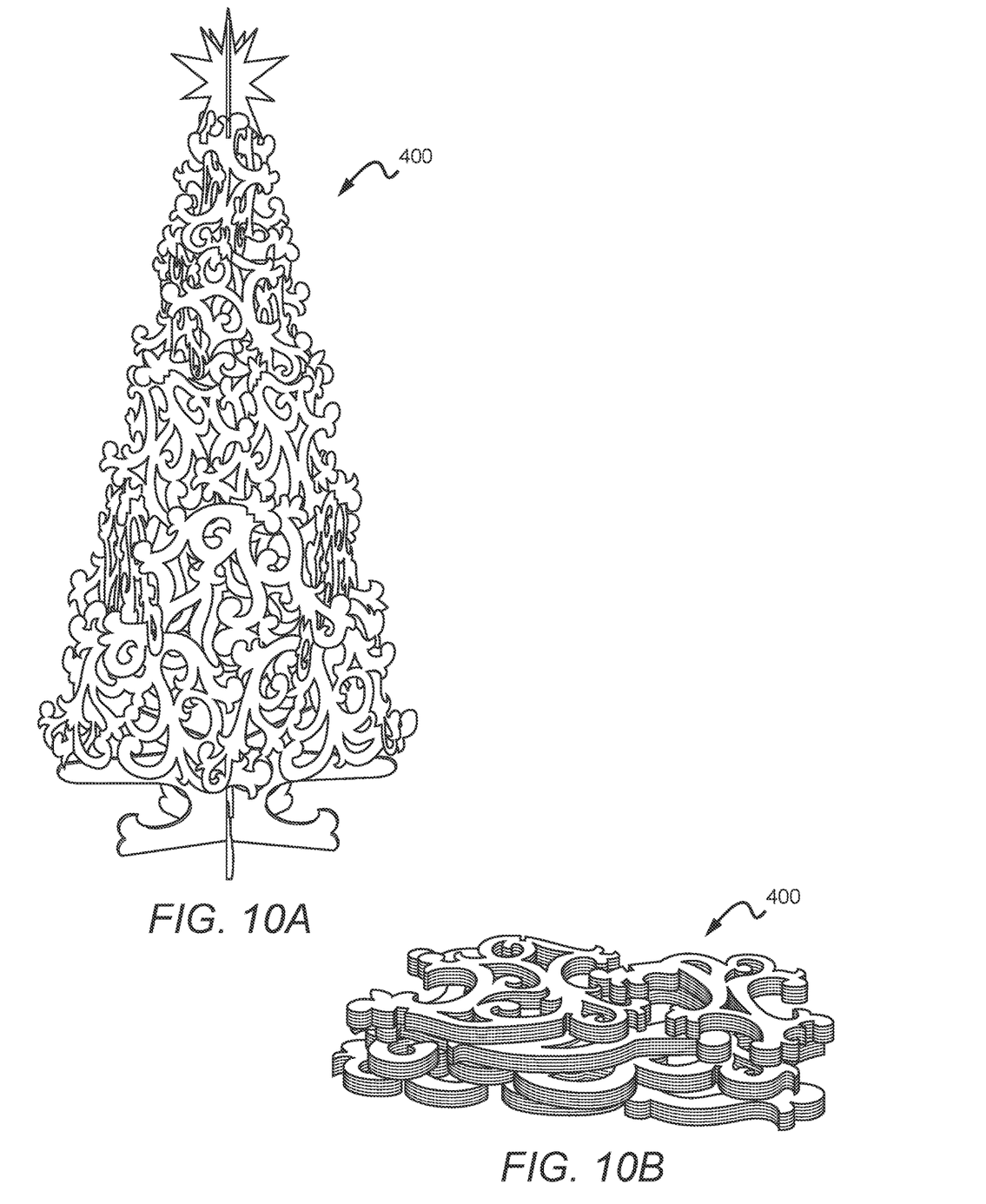
FIG. 10A illustrates a fully assembled object and FIG. 10B illustrates the dissembled object in FIG. 10A in flat pack storage arrangement.

FIG. 10A illustrates another embodiment of a three-dimensional object 400 formed of interlocking panels to form a tree shape having a star and a base. FIG. 10B illustrates the object 400 when disassembled to form a flat pack assembly that can be easily stored. The figure demonstrates the substantial reduction in volume from assembled to disassembled tree. The star and base also disassemble and pack flat.

In the above embodiments, it is contemplated that each of the panels comprises a planar surface along a first plane, such that a depth of each of the panels of a set is identical along its length and width.

This tree concept is scalable—from palm-sized models made from thin sheet stock to large scale commercial installations made from construction grade panel material.

The material of the panels could comprise various materials including wood or plastic, for example, but could is only limited by the strength and stiffness required, be it plywood, cardboard, fiberboard, MDF, plastic, metal, stone, ceramic or any material that can be used for the panels.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A three-dimensional object, comprising:
a first set of interlocking panels each configured to be interlocked with one or more adjacent panels to form a first layer of the object, wherein each of the panels of the first set are identical;
a second set of interlocking panels each configured to be interlocked with one or more adjacent panels to form a second layer of the object, wherein each of the second set of interlocking panels are configured to rest on one or more of the interlocking panels of the first set when the object is assembled, wherein each of the panels of the second set are identical;
a third set of interlocking panels each configured to be interlocked with one or more adjacent panels to form a third layer of the object, wherein each of the third set of interlocking panels are configured to rest on one or more of the interlocking panels of the second set when the object is assembled, wherein each of the panels of the third set are identical;
wherein the panels are the first set have a larger surface area than a surface area of the panels of the second set, and wherein the panels are the second set have a larger surface area than a surface area of the panels of the third set; and
wherein the first set, second set and third set of interlocking panels are each configured to be interlocked with one or more adjacent panels to form the three-dimensional object; and
wherein the second set of interlocking panels are configured to be placed on top of the first set of interlocking panels such that the second set of interlocking panels collectively rest on the first set of interlocking panels, and wherein the third set of interlocking panels are configured to be placed on the second set of interlocking panels such that the third set of interlocking panels collectively rest on the second set of interlocking panels.

2. The object of claim 1, wherein one or more spaces exist between adjacent ones of the interlocking panels when the panels are interlocked.

3. The object of claim 1, wherein the interlocking panels comprise a trapezoidal shape.

4. The object of claim 1, wherein the interlocking panels comprise a polygonal shape having non-planar surfaces.

5. The object of claim 1, wherein each of the panels comprises a first notch in an upper surface and a second notch in a lower surface.

6. The object of claim 5, wherein the first notch is disposed on a left or right side of the panel and wherein the second notch is disposed on the other side of the panel.

7. The object of claim 5, wherein each of the panels comprises a third notch on the upper surface or the lower surface.

8. The object of claim 7, wherein at least some of the panels comprises a fourth notch on the other of the upper surface or the lower surface.

9. The object of claim 1, wherein each of the panels comprises a non-geometric shape.

10. The object of claim 1, wherein each of the panels of the first set comprises:
    a first notch on an upper surface on a first half of the panel;
    a second notch in a lower surface on a second half of the panel; and
    a third notch on the upper surface of the panel;
    wherein the first notch of an adjacent one of the panels is configured to be mated with the second notch.

11. The object of claim 10, wherein each of the panels of the second set comprises:
    a first notch on an upper surface on a second half of the panel;
    a second notch in a lower surface on a first half of the panel;
    a third notch on the upper surface of the panel; and
    a fourth notch on the lower surface of the panel;
    wherein the fourth notch is configured to rest in the third notch of a panel of the first set when the object is assembled.

12. The object of claim 11, wherein each of the panels of the third set comprises:
    a first notch on an upper surface on a first half of the panel;
    a second notch in a lower surface on a second half of the panel;
    a third notch on the upper surface of the panel; and
    a fourth notch on the lower surface of the panel;
    wherein the fourth notch is configured to rest in the third notch of a panel of the second set when the object is assembled.

13. The object of claim 1, further comprising:
    a fourth set of interlocking panels each configured to be interlocked with one or more adjacent panels to form a fourth layer of the object, wherein each of the fourth set of interlocking panels are configured to rest on one or more of the interlocking panels of the third set when the object is assembled, wherein each of the panels of the fourth set are identical;
    a fifth set of interlocking panels each configured to be interlocked with one or more adjacent panels to form a fifth layer of the object, wherein each of the fifth set of interlocking panels are configured to rest on one or more of the interlocking panels of the fourth set when the object is assembled, wherein each of the panels of the fifth set are identical;
    wherein the panels are the third set have a larger surface area than a surface area of the panels of the fourth set, and wherein the panels are the fourth set have a larger surface area than a surface area of the panels of the fifth set; and
    wherein the first set, second set, third set, fourth set and fifth set of interlocking panels are each configured to be interlocked with one or more adjacent panels to form the three-dimensional object; and
    wherein the fourth set of interlocking panels are configured to be placed on top of the third set of interlocking panels such that the fourth set of interlocking panels collectively rest on the third set of interlocking panels, and wherein the fifth set of interlocking panels are configured to be placed on the fourth set of interlocking panels such that the fifth set of interlocking panels collectively rest on the fourth set of interlocking panels.

14. The object of claim 1, wherein each of the panels of the first set, second set, and third set comprises a planar surface along a first plane, such that a depth of each of the panels of a set is identical along its length and width.

\* \* \* \* \*